2,941,977
Patented June 21, 1960

2,941,977

TRANSPARENT MOLDING COMPOSITIONS OF COPOLYMERS OF VINYL AROMATIC HYDROCARBONS AND ESTERS OF METHACRYLIC ACID AND COPOLYMERS OF BUTADIENE AND STYRENE AND METHOD OF MAKING

Arthur F. Roche, Freeland, Bernard H. Tubbs, Clare, and Clifford Jones, Linwood, Mich., assignors to The Dow Chemical Company, Midland, Mich., a corporation of Delaware No Drawing. Filed Aug. 12, 1957, Ser. No. 677,786

6 Claims. (Cl. 260—45.5)

This invention concerns moldable resinous compositions made from hard copolymers of alkenyl aromatic compounds and methacrylic acid esters mixed with relatively soft elastic copolymers of styrene and butadiene. It relates more particularly to homogeneous and inseparable dispersions of mixtures of such copolymers with one another, which compositions are suitable for the manufacture of tough transparent or substantially transparent molded plastic articles.

It is known to mix, or incorporate, natural rubber or a rubbery copolymer of styrene and butadiene, with polystyrene to obtain compositions which can readily be molded by usual compression or injection molding operations or by extrusion methods to form tough plastic articles suitable for a variety of purposes. However, such compositions are usually opaque or translucent masses and this property detracts from their utility for many of the purposes to which they are otherwise well suited.

It has now been found that moldable thermoplastic compositions suitable for the manufacture of transparent plastic articles can readily be obtained by intimately incorporating a hard glass-like copolymer of a monoalkenyl aromatic compound and a methacrylic acid ester, e.g. methylmethacrylate, with a relatively soft elastic copolymer of styrene and butadiene having the same or substantially the same refractive index.

It is important that the refractive indexes of the hard relatively inelastic alkenyl aromatic copolymer and the relatively soft elastic butadiene copolymer starting materials be substantially the same at ordinary temperatures, e.g. at temperatures between 32° and 104° F. Copolymer starting materials having refractive indexes within 0.004 of one another at room temperature, e.g. at 25° C., are usually required in order to obtain clear transparent compositions.

As the hard glass-like thermoplastic alkenyl aromatic copolymer starting material to be employed in preparing the compositions of the invention, copolymers of from 55 to 95 percent by weight of vinyltoluene and from 45 to 5 percent of methylmethacrylate are preferred. Such copolymers in solid or block form have refractive indexes within the range of from $n_D^{25}$ 1.535 to $n_D^{25}$ 1.575. Copolymers of other monoalkenyl aromatic compounds of the benzene series such as styrene, vinylxylene ethylvinylbenzene, or alpha-methyl styrene, and methylmethacrylate in proportions such that the copolymers have refractive indexes within the range just mentioned, or copolymers of any two or more of the alkenyl aromatic compounds and methyl methacrylate, which copolymers have refractive indexes between $n_D^{25}$ 1.535 and $n_D^{25}$ 1.575 can be employed.

It may be mentioned that the refractive index of the copolymer varies with change in the proportion of the methylmethacrylate and the alkenyl aromatic compound chemically combined therewith. Copolymers of styrene and methylmethacrylate having refractive indexes within the range specified are copolymers containing in chemically combined form from about 38 to about 82 percent by weight of styrene and from 62 to 18 percent of methylmethacrylate. Copolymers of alpha-methyl styrene and methylmethacrylate in similar proportions have refractive indexes within the same range. Correspondingly, copolymers of mixtures of vinyltoluene and styrene or vinyltoluene and alpha-methyl styrene, and methylmethacrylate in amounts of from between 5 and 45 percent by weight of the methylmethacrylate and from 95 to 55 percent of the mixture of any two or more of the alkenyl aromatic hydrocarbons vinyltoluene, styrene or alpha-methylstyrene, which copolymers contain in chemically combined form at least 1.4 parts by weight of the vinyltoluene per part of the other alkenyl aromatic component(s) have refractive indexes within the range specified and can suitably be employed as the hard inelastic copolymer starting material in making the compositions of the invention.

Copolymers of vinyltoluene, styrene or alpha-methyl styrene and other methacrylic acid esters such as ethyl methacrylate, butyl methacrylate, or hexyl methacrylate, having the general formula

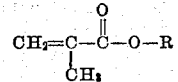

wherein R represents an alkyl radial containing from 1 to 6 carbon atoms, or mixtures of such alkenyl aromatic hydrocarbons and one or more methacrylates having the above formula, which copolymers have refractive indexes between $n_D^{25}$ 1.535 and $n_D^{25}$ 1.575 can also be used.

The relatively soft elastic butadiene copolymer starting materials to be employed in preparing the new compositions are copolymers of from 25 to 70 percent by weight of styrene and from 75 to 30 percent of butadiene. Such copolymers have refractive indexes ranging from $n_D^{25}$ 1.535 for a copolymer containing in chemically combined form approximately 25 percent by weight of styrene and 75 percent of butadiene to a refractive index of $n_D^{25}$ 1.575 for a copolymer of approximately 70 percent by weight of styrene and 30 percent of butadiene. The copolymers can readily be prepared in usual ways, e.g. by polymerizing a mixture of styrene and butadiene in the desired proportions in an aqueous emulsion to obtain a synthetic latex or aqueous colloidal dispersion of the copolymer. The copolymer of styrene and butadiene is recovered from the aqueous emulsion in any usual way, e.g. by adding a strong electrolyte such as aluminum sulfate or magnesium sulfate to coagulate the latex and separating the polymer from the aqueous liquid, or by drying the latex on a heated roll, or spray drying the latex to evaporate the water and collecting the dried latex solids.

The compositions of the invention are prepared by mixing from 30 to 70, preferably from 50 to 70, parts by weight of one of the aforementioned hard glass-like copolymers of one or more monoalkenyl aromatic compounds and a methacrylic acid ester, e.g. methylmethacrylate, said copolymer having a refractive index between $n_D^{25}$ 1.535 and $n_D^{25}$ 1.575 with from 70 to 30, preferably from 50 to 30 parts of a copolymer of styrene and butadiene as previously described having a refractive index at 25° C. within 0.004 of that of the hard copolymer starting material to obtain a homogeneous and inseparable dispersion of the copolymer ingredients with one another.

The copolymer starting materials can be blended or incorporated with one another to form a homogeneous composition in usual ways, e.g. by heat-plastifying and mechanically working a mixture of the polymeric starting materials on compounding rolls, or in a Banbury mixer, or a plastics extruder, to obtain a uniform dispersion of the ingredients with one another. The hard relatively inelastic copolymer starting material is usually heat-plastified, e.g. by milling on compounding rolls, and the elastic copolymer of styrene and butadiene added thereto in the desired proportion. The mixture is usually compounded or mechanically worked at a temperature between 150° and 250° C. until the copolymers are uniformly dispersed with one another with the resultant formation of a homogeneous and inseparable composition. Thereafter the composition is cooled and cut or ground to a granular form suitable for use as a molding powder.

Small amounts of lubricants or flow agents having a boiling point above 200° C. at atmospheric pressure such as butyl stearate, white mineral oil, soy bean oil, or ethyl laurate, may be added in amount corresponding to from 1 to 5 percent by weight of the composition. Other usual additives such as fillers, plasticizers, dyes, pigments, or stabilizing agents, may also be incorporated in the compositions, but such additives are not required.

In a preferred practice, the moldable compositions are prepared by forming a substantially uniform inseparable mixture containing from 50 to 70 parts by weight of a hard transparent copolymer of from 75 to 95 percent by weight of vinyltoluene and from 25 to 5 percent of methylmethacrylate, which copolymer has a refractive index within the range of from $n_D^{25}$ 1.535 to $n_D^{25}$ 1.575, and from 30 to 50 parts of relatively soft elastic copolymer containing in chemically combined form from 45 to 70 percent by weight of styrene and from 55 to 30 percent of butadiene having a refractive index within 0.004 of that of the hard copolymer starting material, said composition containing from 50 to 70 percent by weight of the hard copolymer and from 30 to 50 percent of the elastic copolymer.

The new compositions are transparent or nearly transparent thermoplastic products. They can readily be heat-plastified and shaped by usual compression, injection or extrusion methods to obtain clear plastic articles, e.g., sheet, rods, boxes, cups, toys, combs and the like, having good mechanical properties, which articles are suitable for a variety of purposes.

The following examples illustrate ways in which the principle of the invention has been applied, but are not to be construed as limiting its scope.

EXAMPLE 1

A charge of 915 grams of a hard transparent copolymer of 84 percent by weight of a mixture of approximately 65 percent by weight of meta-vinyltoluene and 35 percent of para-vinyltoluene, and 16 percent of methylmethacrylate, said copolymer having a refractive index $n_D^{25}$ 1.5646, was heat-plastified in a Banbury mixer. A charge of 570 grams of a rubbery copolymer containing in chemically combined form 59 percent by weight of styrene and 41 percent of butadiene, said copolymer having a refractive index $n_D^{25}$ 1.5659, was added, together with 15 grams of white mineral oil as lubricant. The mixture was compounded in the Banbury mixer at temperatures between 350° and 375° F. for a period of approximately 10 minutes, then removed and cooled and cut to a granular form suitable for molding. A portion of the composition was injection molded to form test bars of 1/8 x 1/2 inch cross section. These test bars were used to determine the tensile strength, impact strength and percent elongation values for the composition. The procedures employed in determining the tensile strength and percent elongation were similar to those described in ASTM D638–49T. The procedure for determining the impact strength was similar to that described in ASTM D256–43T. Other molded test pieces of the composition were used to determine the heat distortion temperature employing a procedure of Heirholzer and Boyer see ASTM Bulletin No. 134 of May 1945. The percent of visible light transmitted through molded test plates of the composition of 0.1-inch thickness was also determined. The composition formed transparent moldings and had the properties:

Tensile strength _____lbs./1 sq. in__ 3050
Notched impact strength _____ft.-lbs__ 6.6
Elongation _____percent__ 22.6
Heat distortion temp. _____° C__ 66
Light transmission _____percent__ 73.6

EXAMPLE 2

A charge of 178 grams of a copolymer of 86.5 percent by weight of vinyltoluene and 13.5 percent of methylmethacrylate was heat-plastified by milling the same on a pair of 3-inch diameter by 8 inches long internally heated laboratory rolls. The copolymer had a refractive index $n_D^{25}$ 1.5669. A solution of 10 percent by weight of the copolymer in toluene had an absolute visiosity of 71.4 centipoises at 25° C. The heat-plastified copolymer was compounded with 119 grams of a rubbery copolymer of 57 percent by weight styrene and 43 percent butadiene, having a refractive index $n_D^{25}$ 1.5641, and 3 grams of white mineral oil, over a period of 10 minutes while heating one of the rolls at a temperature of 240° F. and the other roll at a temperature of 330° F. The product was removed from the rolls, allowed to cool and was cut to a granular form suitable for molding. The product was a substantially clear composition. Its properties were determined by procedures similar to those employed in Example 1. The composition had the properties:

Tensile strength _____lbs./sq. in__ 4300
Notched impact strength _____ft.-lbs__ 2.6
Elongation _____percent__ 26.8
Heat distortion temp. _____° C__ 71
Light transmission _____percent__ 69.9

EXAMPLE 3

A composition of 70 percent by weight of the copolymer of vinyltoluene and methylmethacrylate and 30 percent of the rubbery copolymer of styrene and butadiene described in Example 2, was prepared and tested by procedures employed in said example. The procedure was a clear transparent composition and had the properties:

Tensile strength _____lbs./sq. in__ 4230
Notched impact strength _____ft.-lbs__ 0.49
Elongation _____percent__ 19.2
Heat distortion temp. _____° C__ 72
Light transmission _____percent__ 74.4

EXAMPLE 4

A composition containing 60 percent by weight of a hard transparent copolymer of 84 percent by weight of vinyltoluene and 16 percent of methylmethacrylate, which copolymer had a refractive index $n_D^{25}$ 1.5653 and a viscosity characteristic (10 percent by weight solution of the copolymer in toluene) of 15.4 centipoises at 25° C., and 40 percent of the rubbery copolymer of styrene and butadiene described in Example 2, was prepared and tested by procedures employed in said example. The product was a clear transparent composition and had the properties:

Tensile strength _____lbs./sq. in__ 2760
Notched impact strength _____ft.-lbs__ 8.5
Elongation _____percent__ 21.6
Heat distortion temp. _____° C__ 63
Light transmission _____percent__ 71.3

EXAMPLE 5

A charge of 180 grams of a transparent copolymer of approximately 48 percent by weight of styrene, 16 percent of alpha-methyl styrene and 36 percent of methyl methacrylate, was heat-plastified by milling the same on a pair of internally heated 3-inch diameter by 8 inches long compounding rolls. The copolymer had a refractive index of $n_D^{25}$ 1.5588 and a viscosity characteristic (10 percent by weight of the copolymer in toluene) of 11.7 centipoises at 25° C. After heat-plastifying the copolymer on the rolls, there was added 120 grams of a copolymer of 38 percent by weight of butadiene 62 percent of styrene, containing 2.25 grams of butyl stearate and 1.5 grams of 2,6 - di-tertiary-butyl-4-methylphenol. The mixture was compounded on the rolls, one of which rolls was heated at about 350° F. and the other at about 230° F., for a period of 8 minutes, then removed and cut into small pieces and allowed to cool. The butadiene copolymer employed in the experiment had a refractive index of $n_D^{28}$ 1.5610. The composition was ground to granular form suitable for molding. Portions of the composition were molded to form test pieces and the properties determined employing procedures similar to those employed in Example 1. The composition had the properties:

Tensile strength _____ lbs./sq. in.__ 3344
Elongation _____ percent__ 28.8
Notched impact strength _____ ft.-lbs__ 4.3
Heat distortion temp. _____ ° C.__ 90
Transparency _____ Good

EXAMPLE 6

A charge of 195 grams of a copolymer of 85 percent by weight of a mixture of isomeric vinyltoluenes (about 67 percent by weight meta-vinyltoluene and 33 percent paravinyltoluene) and 15 percent of methyl methacrylate, which copolymer had a refractive index $n_D^{25}$ 1.5644, was heat-plastified on laboratory rolls and compounded with 105 grams of a rubbery copolymer of about 57 percent by weight of butadiene and 43 percent of styrene having a refractive index of $n_D^{25}$ 1.5635, together with 0.75 gram of butyl stearate and 0.5 gram of 2,4-di-tert-butyl-4-methylphenol, to form a homogenous composition. Portions of the composition were injection molded and formed transparent test bars. The composition had the properties:

Tensile strength _____ lbs./sq. in.__ 3200
Elongation _____ percent__ 25
Notched impact strength _____ ft.-lbs__ 7.1
Color _____ Transparent In contrast, a composition prepared from similar proportions of a copolymer of 90 percent by weight of the meta- and para-vinyltoluenes and 10 percent of methylmethacrylate, which copolymer had a refractive index $n_D^{25}$ 1.5703, and the rubbery copolymer of styrene and butadiene having a refractive index $n_D^{25}$ 1.5635, when injection molded formed opaque test bars.

EXAMPLE 7

In each of a series of experiments, a charge of a copolymer of 85.2 percent by weight of vinyl-toluenes (about 67 percent meta-vinyltoluene and 33 percent para-vinyltoluene) and 14.8 percent of methylmethacrylate, which copolymer had a refractive index $n_D^{25}$ 1.5657 and a viscosity characteristic of 22.4 centipoises (10 weight percent solution of the copolymer in toluene at 25° C.) was heat-plastified on compounding rolls and intimately blended with a rubbery copolymer of about 57 percent by weight of butadiene and 43 percent of styrene having a refractive index $n_D^{25}$ 1.5669, together with one percent by weight of white mineral oil, based on the total weight of the polymeric ingredients, in proportions as stated in the following table. The composition was cooled, ground to a granular form and molded to form test bars. Properties for the composition were determined employing procedures similar to those employed in Example 1. The table identifies the compositions by giving the proportions in percent by weight of the polymeric ingredients employed in preparing the same. The table also gives the properties determined for the compositions.

Table

| Run No. | Starting Materials | | Product | | | | |
|---|---|---|---|---|---|---|---|
| | Copolymer of vinyltoluene and methylmethacrylate | Copolymer of styrene and Butadiene, percent | Tensile strength, lbs./sq. in. | Elongation, percent | Notched Impact strength, Ft.-lbs. | Heat Distortion Temperature, °C | Light Transmission, percent |
| 1 | 90 | 10 | 5,890 | 3.6 | 0.3 | 79 | 82.9 |
| 2 | 80 | 20 | 5,140 | 5.1 | 0.23 | 73 | 77.9 |
| 3 | 70 | 30 | 4,060 | 11.8 | 0.4 | 74 | 75.8 |
| 4 | 60 | 40 | 3,140 | 23.3 | 4.9 | 72 | 78.7 |

We claim:

1. A transparent moldable thermoplastic composition of matter comprising from 50 to 70 parts by weight of a copolymer having a refractive index between $n_D^{25}$ 1.5350 and $n_D^{25}$ 1.5750 and containing in chemically combined form from 5 to 62 percent by weight of a methacrylic acid ester having the general formula:

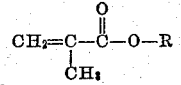

wherein R represents an alkyl radical containing from 1 to 6 carbon atoms, and from 95 to 38 percent of at least one monoalkenyl aromatic hydrocarbon selected from the group consisting of styrene, vinyltoluene and alpha-methyl styrene, and intimately incorporated with said copolymer from 50 to 30 parts by weight of a copolymer of from 23.5 to 70 percent by weight of styrene and from 76.5 to 30 percent of butadiene, which copolymer has a refractive index between $n_D^{25}$ 1.5350 and $n_D^{25}$ 1.5750 and within 0.004 of that of the copolymer of the alkenyl aromatic hydrocarbon and the methacrylic acid ester.

2. A composition as claimed in claim 1, wherein the methacrylic acid ester is methyl methacrylate.

3. A composition as claimed in claim 1 wherein the monoalkenyl aromatic hydrocarbon is vinyltoluene.

4. A transparent moldable thermoplastic composition of matter comprising from 50 to 70 parts by weight of a copolymer having a refractive index between $n_D^{25}$ 1.5550 and 1.5750 and containing in chemically combined form from 5 to 25 percent by weight of methyl methacrylate and from 95 to 75 percent of vinyltoluene, and intimately incorporated with said copolymer from 50 to 30 parts by weight of a copolymer of from 45 to 70 percent by weight of styrene and from 55 to 30 percent of butadiene, which copolymer has a refractive index between $n_D^{25}$ 1.5550 and $n_D^{25}$ 1.5750 and within 0.004 of that of the copolymer of vinyltoluene and methyl methacrylate.

5. A transparent moldable thermoplastic composition of matter comprising from 50 to 70 parts by weight of a copolymer having a refractive index between $n_D^{25}$ 1.5550 and $n_D^{25}$ 1.5750 and containing in chemically combined form from 18 to 50 percent by weight of methyl methacrylate and from 82 to 50 percent by weight of a mixture of styrene and alpha-methyl styrene, and intimately incorporated with said copolymer from 50 to 30 parts by weight of a copolymer of from 42 to 70 percent by weight of styrene and from 58 to 30 percent of butadiene, which copolymer has a refractive index between $n_D^{25}$ 1.5550 and $n_D^{25}$ 1.5750 and within 0.004 of that of the copolymer of styrene, alpha-methyl styrene and methyl methacrylate.

6. A process for making a moldable thermoplastic composition of matter suitable for making transparent plastic articles which process comprises intimately incorporating from 50 to 70 parts by weight of a copolymer having a refractive index between $n_D^{25}$ 1.5350 and $n_D^{25}$ 1.5750 and containing in chemically combined form from 5 to 62 percent by weight of a methacrylic acid ester having the general formula:

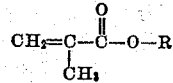

wherein R represents an alkyl radical containing from 1 to 6 carbon atoms, and from 95 to 38 percent of at least one monoalkenyl aromatic hydrocarbon selected from the group consisting of styrene, vinyltoluene and alpha-methyl styrene, with from 50 to 30 parts by weight of a copolymer of from 23.5 to 70 percent of styrene and from 76.5 to 30 percent of butadiene, which copolymer has a refractive index between $n_D^{25}$ 1.5350 and $n_D^{25}$ 1.5750 and within 0.004 of that of the copolymer of the monoalkenyl aromatic hydrocarbon and the methacrylic acid ester, by heat-plastifying and mechanically working the copolymeric ingredients in admixture with one another at temperatures between 150° and 250° C. with resultant formation of a uniform composition.

References Cited in the file of this patent
UNITED STATES PATENTS

| | | |
|---|---|---|
| 2,311,613 | Slayter | Feb. 16, 1943 |
| 2,574,439 | Seymour | Nov. 6, 1951 |
| 2,614,093 | Wheelock | Oct. 14, 1952 |